US009109957B2

(12) United States Patent
Pedersen et al.

(10) Patent No.: US 9,109,957 B2
(45) Date of Patent: Aug. 18, 2015

(54) TEMPERATURE SENSOR UNIT AND A METHOD FOR MAKING THE SAME

(75) Inventors: Svend Peder Pedersen, Soenderborg (DK); Jan Dyhr, Sydals (DK)

(73) Assignee: Danfoss A/S, Nordborg (DK)

(*) Notice: Subject to any disclaimer, the term of this patent is extended or adjusted under 35 U.S.C. 154(b) by 118 days.

(21) Appl. No.: 13/255,687

(22) PCT Filed: Mar. 11, 2010

(86) PCT No.: PCT/DK2010/000029
§ 371 (c)(1),
(2), (4) Date: Oct. 17, 2011

(87) PCT Pub. No.: WO2010/102628
PCT Pub. Date: Sep. 16, 2010

(65) Prior Publication Data
US 2012/0039362 A1   Feb. 16, 2012

(30) Foreign Application Priority Data
Mar. 13, 2009   (DK) .................................. 2009 00356

(51) Int. Cl.
*G01K 1/08* (2006.01)
(52) U.S. Cl.
CPC ............. *G01K 1/08* (2013.01); *Y10T 29/49179* (2015.01)
(58) Field of Classification Search
CPC ......... G01K 1/08; G01K 13/002; G01K 7/42; G01K 7/01; G01K 1/16; G01K 7/04; G01K 7/02; G01K 1/14; G01K 7/021; G01K 7/22; G01K 7/16; G01K 7/183; G01K 7/20; G01K 7/24; G06F 1/206

USPC .................. 374/163, 179, 185, 183; 702/131, 702/133–136
See application file for complete search history.

(56) References Cited

U.S. PATENT DOCUMENTS 4,087,775 A * 5/1978 MacKenzie et al. ............ 338/28
4,590,669 A * 5/1986 Imamura ......................... 29/612
(Continued)

FOREIGN PATENT DOCUMENTS

CH    650 861 A5   8/1985
DE    43 41 239 A1   6/1994
(Continued)

OTHER PUBLICATIONS

International Search Report for Serial No. PCT/DK2010/000029 dated Jun. 25, 2010.

*Primary Examiner* — Lisa Caputo
*Assistant Examiner* — Janice M Soto
(74) *Attorney, Agent, or Firm* — McCormick, Paulding & Huber LLP

(57) ABSTRACT

A method of manufacturing a temperature sensor unit comprising the steps of: providing the conductors in the sheath such that in a first zone a space is defined between the sheath and the conductors; providing the second insulating material in liquid form in the space; positioning the sensors in the space such that the conductors are provided closer to the center of the sheath than the sensors; and soldering and/or welding the set of conductors to the set of terminals. A temperature sensor in which sets of conductors and one or more temperature sensors are arranged inside a sheath and with respect to each other such that the conductors are provided closer to the center of the sheath than the temperature sensors.

18 Claims, 8 Drawing Sheets

(56) References Cited

U.S. PATENT DOCUMENTS

| | | | |
|---|---|---|---|
| 4,731,417 A * | 3/1988 | Miyata et al. | 525/200 |
| 5,309,133 A * | 5/1994 | Berger et al. | 338/22 R |
| 5,999,081 A | 12/1999 | Hannigan et al. | |
| 6,264,363 B1 * | 7/2001 | Takahashi et al. | 374/185 |
| 6,568,849 B1 * | 5/2003 | Chen et al. | 374/185 |
| 2004/0246881 A1 * | 12/2004 | Sakaue et al. | 369/275.2 |
| 2005/0265426 A1 | 12/2005 | Hanzawa et al. | |
| 2008/0080586 A1 * | 4/2008 | Huetter et al. | 374/31 |
| 2008/0205484 A1 * | 8/2008 | Toudou et al. | 374/185 |

FOREIGN PATENT DOCUMENTS

| | | |
|---|---|---|
| EP | 1 975 580 A2 | 1/2008 |
| FR | 2 479 983 | 8/1985 |
| GB | 1 448 709 | 9/1976 |
| WO | WO20080156082 * | 12/2008 |

\* cited by examiner

TEMPERATURE SENSOR UNIT AND A METHOD FOR MAKING THE SAME

CROSS REFERENCE TO RELATED APPLICATIONS

This application is entitled to the benefit of and incorporates by reference essential subject matter disclosed in International Patent Application No. PCT/DK2010/000029 filed on Mar. 11, 2010 and Danish Patent Application No. PA 2009 00356 filed Mar. 13, 2009.

FIELD OF THE INVENTION

The present invention relates to a temperature sensor unit with a temperature sensor provided in a sheath and an insulating material provided in the space between the sheath and the temperature sensor. Moreover the present invention relates to a method of manufacturing the temperature sensor unit.

BACKGROUND OF THE INVENTION

Temperature sensors are known to be used to monitor operation of apparatuses with a high temperature environment. As an example, this could e.g. be an engine of an automobile in which it is desirable that the engine does not overheat.

One example of such a high temperature sensor is known form U.S. Pat. No. 4,087,775 which discloses a temperature sensing probe including a resistance temperature device (RTD) which is provided in a sheath. The RTD is provided in a sheath and electrically connected to a pair of terminals. The RTD is received in a bore together with an adequate layer of cement. The terminals are insulated with respect to the sheath and each other by means of a firmly compacted mass of pulverized refractory.

Other background art may be seen in GB 1,448,709.

When arranged in an engine, the temperature sensors are placed in a tough environment in which the temperature sensors are subjected to strong and continuous vibration. In such an environment, the solderings/weldings of the terminals of the temperature sensor to electrical conductors are prone to breaking. This causes the temperature sensor to break down such that it must be replaced.

SUMMARY OF THE INVENTION

It is an object of embodiments of the present invention to provide a temperature sensor unit with a stronger soldering or weldings between the conductors of the temperature sensor unit and the terminals of the sensor.

It is an object of embodiments of the present invention to provide a temperature sensor unit with an improved period of operation relative to known temperature sensors.

It is an object of embodiments of the present invention to provide a temperature sensor unit with means for improving the retaining of the temperature sensor itself inside the temperature sensor unit.

It is an object of embodiments of the present invention to provide a method for soldering and/or welding in the close environment inside the sheath of the temperature sensor unit.

It is an object of embodiments of the present invention to provide a method for laser soldering and/or welding the conductors and the terminals without damaging the temperature sensor by the heat generated with the laser beam.

In a FIRST aspect the present invention relates to a method of manufacturing a temperature sensor unit comprising:
a sheath;
one or more temperature sensors each of which comprises a set of sensor terminals;
at least one set of conductors, the set of conductors being soldered and/or welded to the set of sensor terminals; and
a second insulating material;
wherein the conductors and the temperature sensors are arranged with respect to each other such that the conductors are provided closer to the centre of the sheath than the sensors;
the method comprising the steps of:
providing the conductors in the sheath such that in a first zone a space is defined between the sheath and the conductors;
providing the second insulating material in liquid form in the space;
positioning the sensors in the space such that the conductors are provided closer to the centre of the sheath than the sensors; and soldering and/or welding the set of conductors to the set of terminals.

One advantage of using an insulating material that has a liquid state and a solid state is that the temperature sensor may be inserted into the insulator when it is in its liquid state and retained in the insulator until the insulator has reached its solid state. Compared to a granulated insulator, the solid state insulator will not cause the sensor to be displaced during operation of the temperature sensor unit as the solid state insulator forms one large solid element compared to a plurality of displaceable granulated elements. It will be appreciated that in order for the insulator to be usable, the insulator must be capable of being in liquid form at a temperature range which is not damaging to the temperature sensor. Moreover, the insulator must be capable of being in solid form at a temperature range covering at least the operational temperatures of the environment in which the temperature sensor unit is to be used. Different kinds of insulators for use under the first aspect of the invention are described under the second aspect of the invention.

Generally it is noted that the invention according to this first aspect may comprise any combination of features and/or elements of the second aspect of the invention (which relates to the temperature sensor unit per se) and vice versa.

One further advantage of the present invention is that the less viscous the insulator is at in its liquid state, the better the fit between the sheath, the insulator and the temperature sensor may be as any air pockets may escape more easily. It will be appreciated that this reduces the risk of damage of the temperature sensor even further due to the improved fit.

The step of positioning the sensors may precede the step of providing the second insulating material such that the second insulating material is poured into the sheath when the sensors are already provided in the previously mentioned space.

Alternatively, the step of providing the second insulating material may precede the step of positioning the sensors. In one embodiment, the step of positioning the sensors comprises the step of positioning the sensors in the second insulating material while the second insulating material is in liquid form.

In one embodiment, the step of providing the conductors comprises the step of: providing a sheath in which the set of conductors are already retained relative to the sheath by means of a first insulating material. Such a sheath comprising the conductors and the first insulating material may be provided in the form of long prefabricated tubes comprising the conductors which are retained inside the tube by means of the first insulating material. Thus, this step may comprise a further step of cutting the prefabricated tube into pieces of a desired length. This step may be performed by means of any conventional cutting technique such as punching or sawing or laser cutting.

When such a prefabricated tube is used, the conductors in the sheath are totally encapsulated by the insulating material of the prefabricated tubes. This material must be removed in order to allow insertion of the temperature sensors into the sheath.

Accordingly, the step of providing the conductors may further comprise the step of: removing a part of the first insulating material in a distal end of the sheath. The insulating material may be removed by sand blasting a desired amount of material away or by laser evaporating the material or by means of a cutting tool or by means of any other method for removing material.

Subsequently, the method may comprise a step of: reducing the length of the conductors in the area in which the first insulating material was removed, i.e. the distal most part of the conductors. This step ensures that there is room for soldering and/or welding the terminals of the temperature sensor to the conductors. In one embodiment, the conductors are shortened such that the distal end of the conductors are provided 1-2 mm below the distal edge of the sheath, such as 3-4 mm, such as 5-6 mm, such as 7-8 mm.

The step of providing the second insulating material in liquid form in a space between the sheath and the conductors, may be carried out while the distal end faces in an upwards direction such that the second insulating material may be poured into the sheath and layered onto the distal/upper end surface of the first insulating material. It will be appreciated that in order to allow room for soldering and/or welding the conductors to the terminals of the temperature sensor, the space in which the first insulating material has been removed shall only be partly filled with the second insulating material. However, as the second insulating material also serves the purpose of retaining the conductors, the sheath shall be filled with the second insulating material such that only a short part of the distal end is not covered by this material. The short part may be 1-2 mm, such as 3-4 mm. Thus when the second insulating material is cured, the conductors remain fixed during the welding/soldering process.

At this stage, the temperature sensors can be inserted into the liquidised second insulating material in a position in which the conductors are closer to the centre of the sheath than the temperature sensors. In embodiments wherein the sheath forms a cylindrical element, this centre is the centre axis of the cylinder. The shape of a cross-section of the sheath in a direction transverse to the longitudinal direction of the sheath may take any form such as a circle, an oval shape, a polygonal shape e.g. with three edges, such as four, such as five, such as six.

In some embodiments, the step of positioning the sensors comprises the step of: positioning the sensors in a position in which the sensors are closer to the sheath than the conductors. It will be appreciated that as the conductors may conduct heat during the step of soldering/welding (which is described in further detail below), it is desirable that the temperature sensors are spaced apart from the conductors, such that the sensors are protected from the heat. In one embodiment, the distance from the temperature sensor to the sheath constitutes a third of the distance from the closest conductor to the sheath, such as a fourth, such as a fifth.

The method may comprise a step of curing the second insulating material, so as to bring the second insulating material form a liquid state to a solid state. In one embodiment, this may be done by application of heat and/or ultraviolet radiation.

When the second insulating material is cured, the temperature sensors are retained relative to the sheath and the conductors by means of the second insulating material. At this stage the terminals of the temperature sensor may be welded/soldered to the conductors.

In one embodiment, the step of soldering comprises the step of: soldering by means of a laser beam. It will be appreciated that the laser beam is especially advantageous in the narrow sheaths as the beam may be emitted from the outside and into the interior of the sheath. Thus, no elements need be inserted into the sheath as would be the case with conventional tools. When a laser beam is used, a solder (e.g. a paste comprising lead-silver or cadmium-silver) is provided in the area of the distal end of the terminals and the conductors, subsequently the laser beam is directed into the sheath, such that at least a part of the laser beam hits the distal ends and the solder material. At this stage the temperature sensor is covered by the second insulating material, and thus protected from the being damaged by the laser beam. This is important as the laser may elevate surfaces to temperatures above 900 degrees Celsius. Moreover, the second insulating material serves as a thermal insulator relative to the heat conducted from the distal ends of the conductors (which are heated by the laser beam). In order to minimize process time, the laser beam may be chosen and/or arranged such that it may emit the laser light to all the areas to be soldered/welded at the same time, instead of being directed to each of the areas, one at the time.

Alternatively, the soldering may be carried out by means of an electric soldering iron which is brought into contact with the solder and the distal ends of the terminal and the conductor.

In order to protect the solderings/weldings, a third insulating material may be provided on top of the second insulating material. Accordingly, the method may comprise the steps of: providing a third insulating material in the area of the solderings/weldings so as to cover the solderings/weldings; and providing a cover at the distal end of the sheath so as to cover the third insulating material.

One advantage of providing the third insulating material is that the weldings/solderings are firmly fixed and thus not broken by vibrations e.g. from an engine. A further advantage is that the third insulating layer protects the solderings/weldings and the conductors/terminals during soldering of the cover to the sheath, as any liquidised soldering material is prevented from flowing from the area of the cover and into the sheath. This prevents the conductors and terminals from unwanted short-circuits.

The step of providing the cover may comprise the step of welding the cover to the sheath. Prior to providing the cover, the distal end of the sheath and/or the third insulating material may be ground. By grinding the distal end(s) a more even surface may be obtained which allows for a better welding. Accordingly, the method may comprise the steps of: grinding the distal end of the sheath; and securing the cover to the ground distal end.

In a SECOND aspect, the present invention relates to a temperature sensor unit comprising:
   a sheath;
   one or more temperature sensors each of which comprises a set of sensor terminals; and
   at least one set of conductors, the set or conductors being electrically connected to the set of sensor terminals;

wherein the conductors and the temperature sensors are arranged inside the sheath and with respect to each other such that the conductors are provided closer to the centre of the sheath than the temperature sensors.

The sheath may comprise metal material such as stainless steel.

The temperature sensor may be any temperature sensor suitable for operating in a high temperature environment such as an environment in which the temperature is above 200 degrees Celsius, such as above 400 degrees Celsius, such as above 600 degrees Celsius, such as above 800 degrees Celsius, such as above 1000 degrees Celsius. One example is a platinum sensor. Each sensor comprises a set of terminals for electrically connecting the sensor to an electrical circuit. The terminals and the conductors may comprise any electrically conductive material such as silver, gold, platinum or copper.

In order to protect the temperature sensors from any heat thermally conducted by means of the conductors, one or more of the temperature sensors are provided closer to the sheath than to any of the conductors. It will be appreciated that the larger the distance from the sensor to the closest conductor is, the better the thermal protection is.

In one embodiment, the length of the sensor terminals is at least 20 times the width of the sensor terminals, such as at least 50 times, such as at least 100 times such as at least 200 times. It will be appreciated that the longer the terminals are relative to their width, the lower is the risk of the sensors being damaged by the heat conducted via the terminals.

In one embodiment, each conductor defines an accessible end and a connected end, the connected end is welded and/or soldered to one of the sensor terminals, and the accessible end is accessible from an outer surface of the temperature sensor unit.

In one embodiment, the temperature sensor unit comprises a plurality of temperature sensors, and the set of sensor terminals of one or more (such as each) of the temperature sensors is connected to the same set of conductors. As an example two conductors may be provided, and the two sets of terminals from two sensors may be electrically connected (e.g. in parallel) to said two conductors.

In one embodiment, two sets of conductors and two temperature sensors are provided such that each set of conductors is electrically connected to one of the temperature sensors.

In alternative embodiments three sets of conductors and three temperature sensors are provided. In yet another alternative four sets of conductors and four temperature sensors are provided. In one particular embodiment one set of conductors and one temperature sensor is provided.

One advantage of having a plurality of temperature sensors is that if one of the temperature sensors fails during operation of the temperature sensor unit, the remaining sensors may provide the temperature readings. Thus, the risk of erroneous readings during critical use situations may be prevented, and the defect sensor unit may be replaced at a later stage.

Moreover, the sensor terminals and the connected ends of the conductors may be arranged to extend in a distal direction of the temperature sensor unit, i.e. towards the distal end of the tube which during a manufacturing process using the method according to the first aspect forms an open end. This allows for use of a laser beam for the welding/soldering process.

In one embodiment, at least one insulating material is provided between each sensor and the conductors. It will be appreciated that this is the second insulating material previously described. The insulating material serves the purpose of protecting the sensor from the laser light and the purpose of thermally insulating the sensor from the conductors, which during the welding/soldering process may conduct the generated heat. Moreover, the insulating material serves the purpose of electrically insulating the conductors and the terminals so as to prevent electrical short-circuiting during use.

The at least one insulating material may be a mouldable material which is adapted to protect the sensor from radiation of a laser beam. In one embodiment, the mouldable material has a transmittance of laser light which is less than 30 percent of the transmittance of laser light in air, at room temperature, such as less than 50 percent, such as less than 70 percent, such as less than 90 percent. The reduced transmittance may be coursed by the laser light being absorbed and/or reflected and/or scattered by the insulating material. It will be appreciated that if the laser light is absorbed in the material the temperature of the insulating material rises. Thus, it may be preferred to reflect or scatter the laser light away from the second insulating material. Accordingly in one embodiment of the invention, a layer of a reflective material is applied to the upper (distal) surface of the insulating material.

Examples of suitable mouldable materials are high temperature mouldable materials or cements e.g. comprising one or more oxides such as aluminiumoxide. In one embodiment, the mouldable material/cement is capable of being subjected to operation temperatures of up to 600 degrees Celsius, such as up to 800 degrees Celsius, such as up to 1000 or 1200 or 1400 degrees Celsius.

BRIEF DESCRIPTION OF THE DRAWINGS

The invention will now be described with reference to the figures in which.

DETAILED DESCRIPTION OF THE PREFERRED EMBODIMENTS

The below description of the figures illustrates an embodiment of the manufacturing process according to the first aspect of the invention. An embodiment of the product according to the second aspect is disclosed in FIG. 8.

Figure 1:
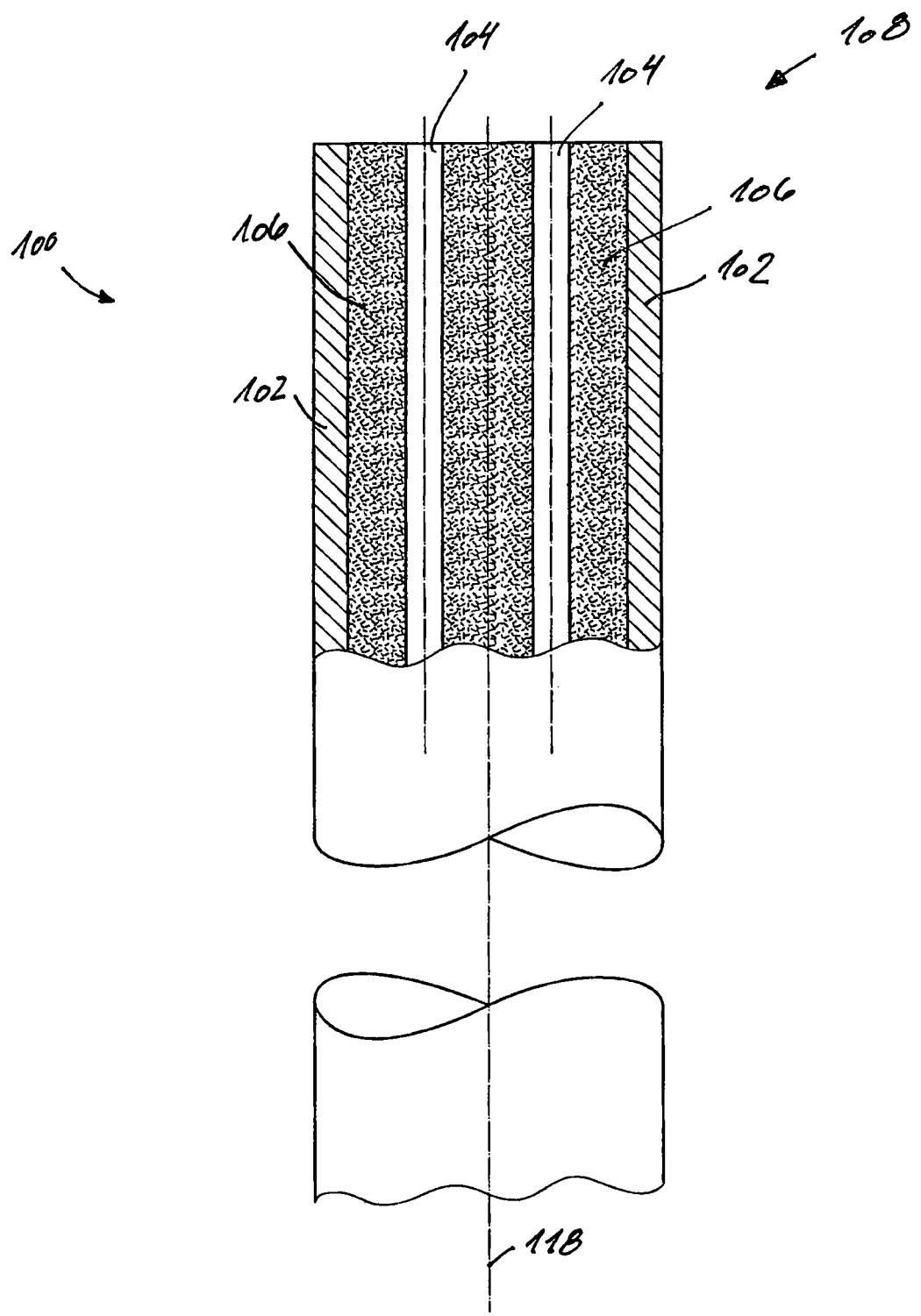
FIG. 1 discloses a prefabricated tube with the sheath, the conductors and the first insulating material, FIG. 2 discloses the step of removing a part of the first insulating material, FIG. 3 discloses the step of shortening the length of the conductors, FIG. 4 discloses the step of providing the second insulating material and inserting the temperature sensors, FIGS. 5 and 6 disclose the step of electrically connecting the terminals and the conductors, FIG. 7 discloses the step of providing the third insulating material, and FIG. 8 discloses the step of providing a cover.

FIG. 1 discloses a prefabricated tube 100 comprising a sheath 102 in which the conductors 104 are retained by means of a first insulating material 106, e.g. hard pressed sand. Initially, only a distal end 108 of the prefabricated tube 100 is cut. Then the prefabricated tube 100 is cut into a piece of a desired length. This piece forms the distal end 108 and a proximal end (not disclosed). In the embodiment of FIGS. 1-8, four conductors 104 are provided, but due to the viewing angle only two of the conductors are visible in FIG. 1.

Figure 2:
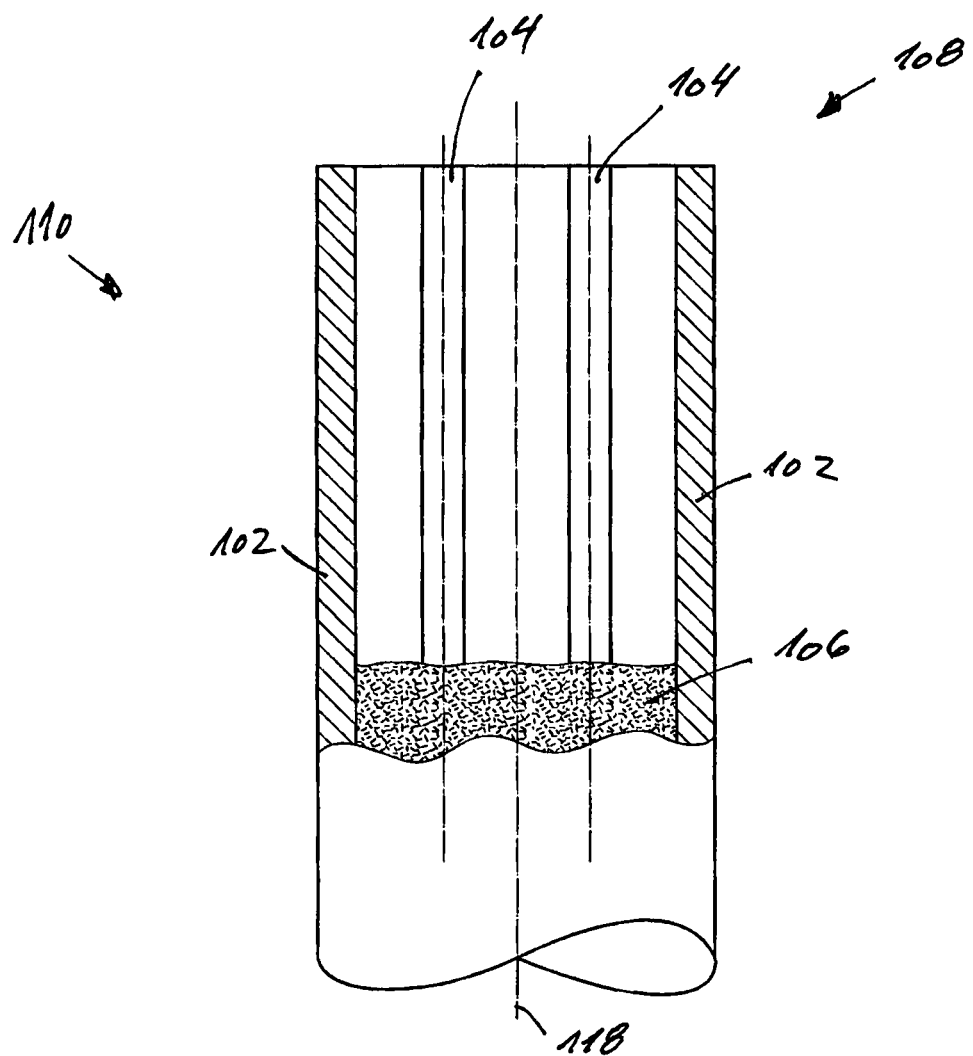

FIG. 2 discloses the tube piece 110 resulting from cutting the prefabricated tube 100 of FIG. 1. In FIG. 2, a part of the first insulating material 106 has been removed from the distal end 108 of the tube piece 110 whereby the distal end of the conductors 104 is not surrounded by the first insulating material. The first insulating material 106 may be removed by sand blasting the distal end of the tube piece 110. An advantage of blasting with sand is that the sand relative to a cutting tool may access the narrow interior of the tube more easily. When the material is removed, a space 112 is formed.

Figure 3:
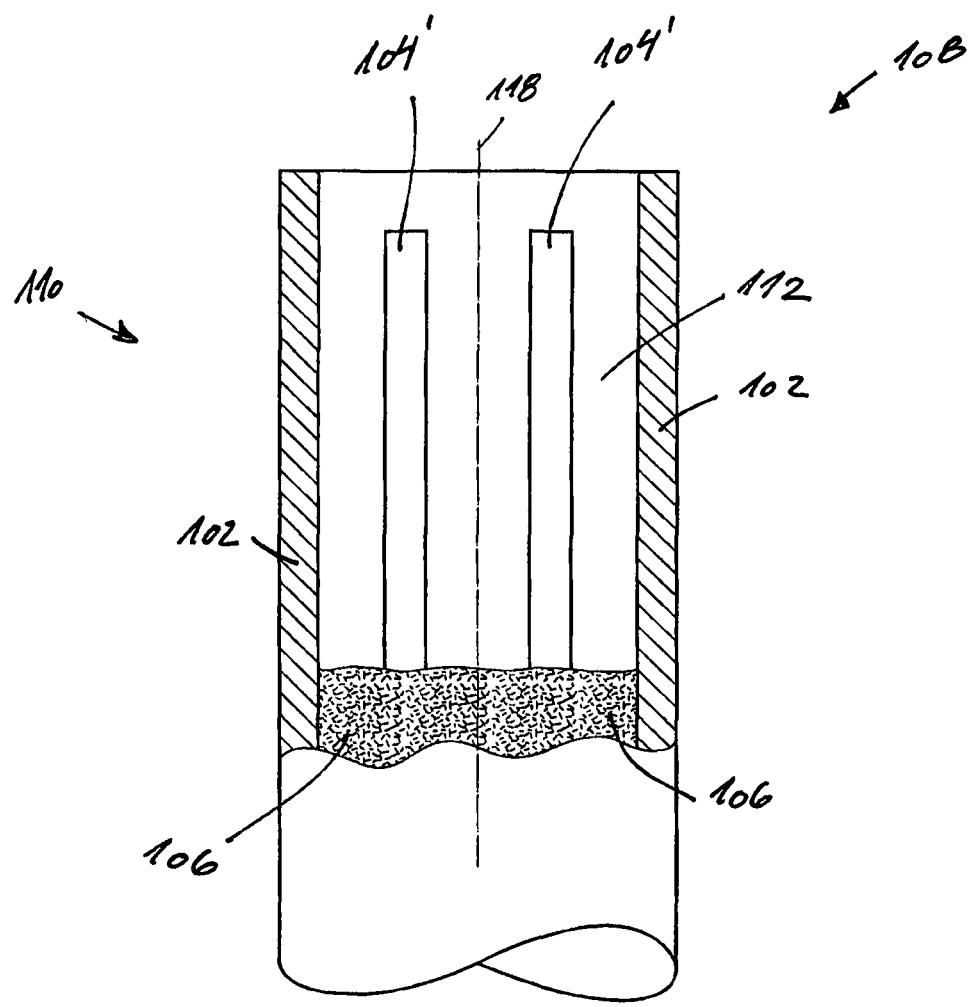

Subsequently in FIG. 3, the distal ends of the conductors 104 are cut, hereinafter called the cut conductors 104'.

Figure 4:
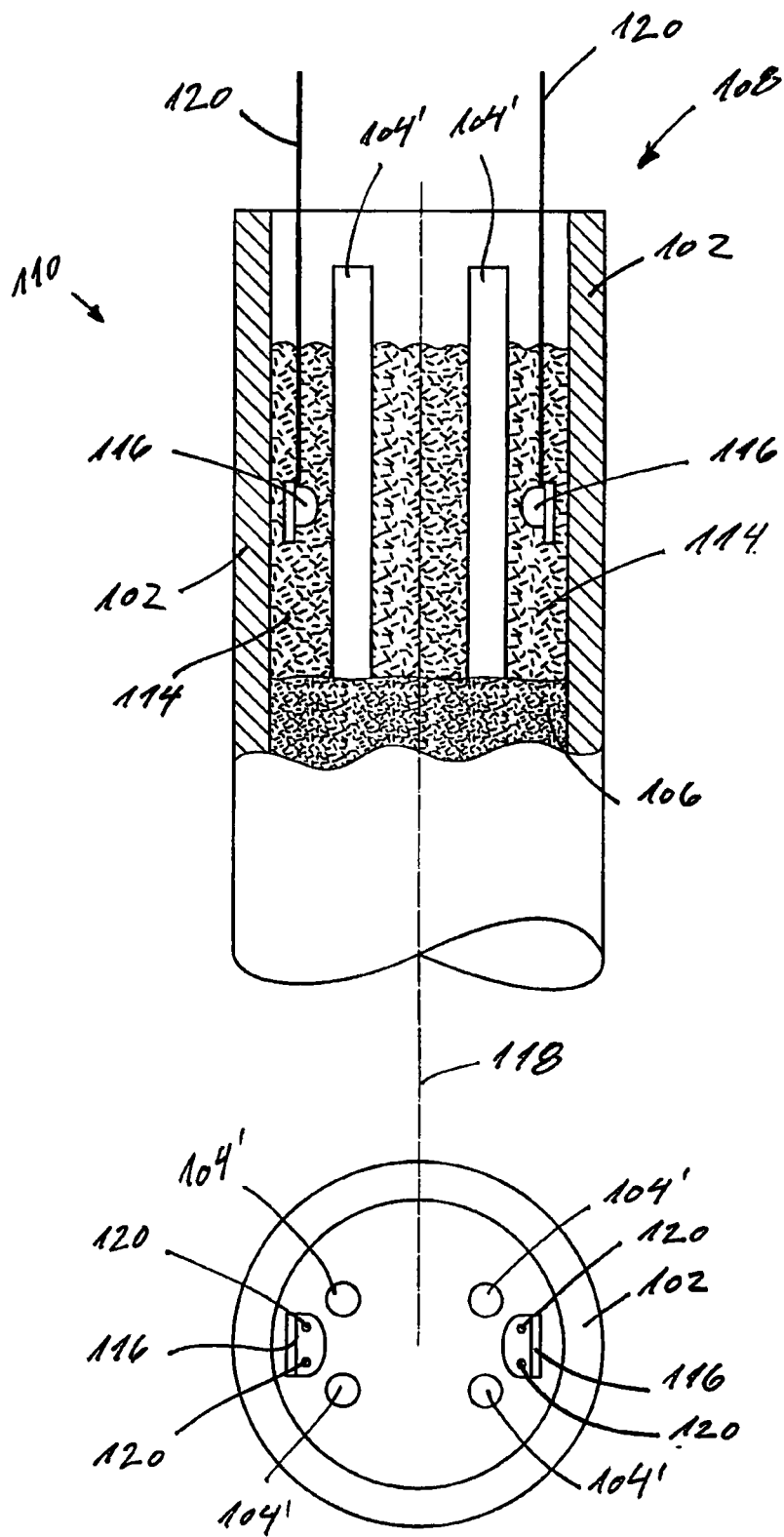

In FIG. 4, the lower (proximal) part of the space 112 is filled with a second insulating material 114. The volume of the second insulating material 114 is chosen such that the distal ends of the cut conductors 104' are not covered, thus allowing a laser light to hit said distal part during the soldering or welding process.

In one embodiment, 1-2 mm of the distal end is not covered by the second insulating material 114.

Subsequently, the temperature sensors 116 are inserted into the second insulating material 114 and retained in a position in which the cut conductors 104' are closer to the centre 118 of the tube piece 110 than the temperature sensor 116. The temperature sensors 116 are kept in this position until the second insulating material is cured, whereby the temperature sensors 116 continues to be retained in this position by means of the second insulating material 114. It is noted that for illustrative purposes the second insulating material 114 is not discloses in the lower part of FIG. 4, such that the temperature sensors 116 may be seen.

Figure 5:
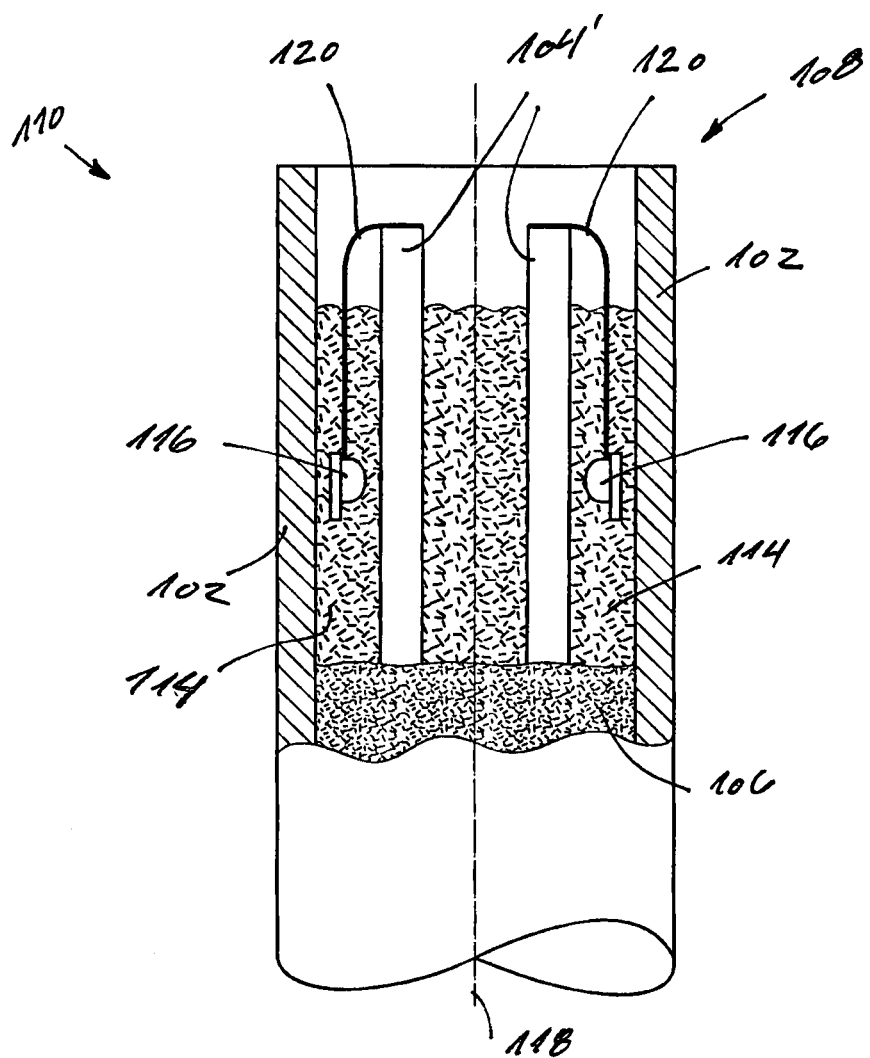

Subsequently in FIG. 5, the terminals 120 of the temperature sensors 116 are cut to a desired length and bend such that the distal ends of the terminals 120 are positioned in contact with or just in the vicinity of the distal ends of the cut conductors 104'.

Figure 6:
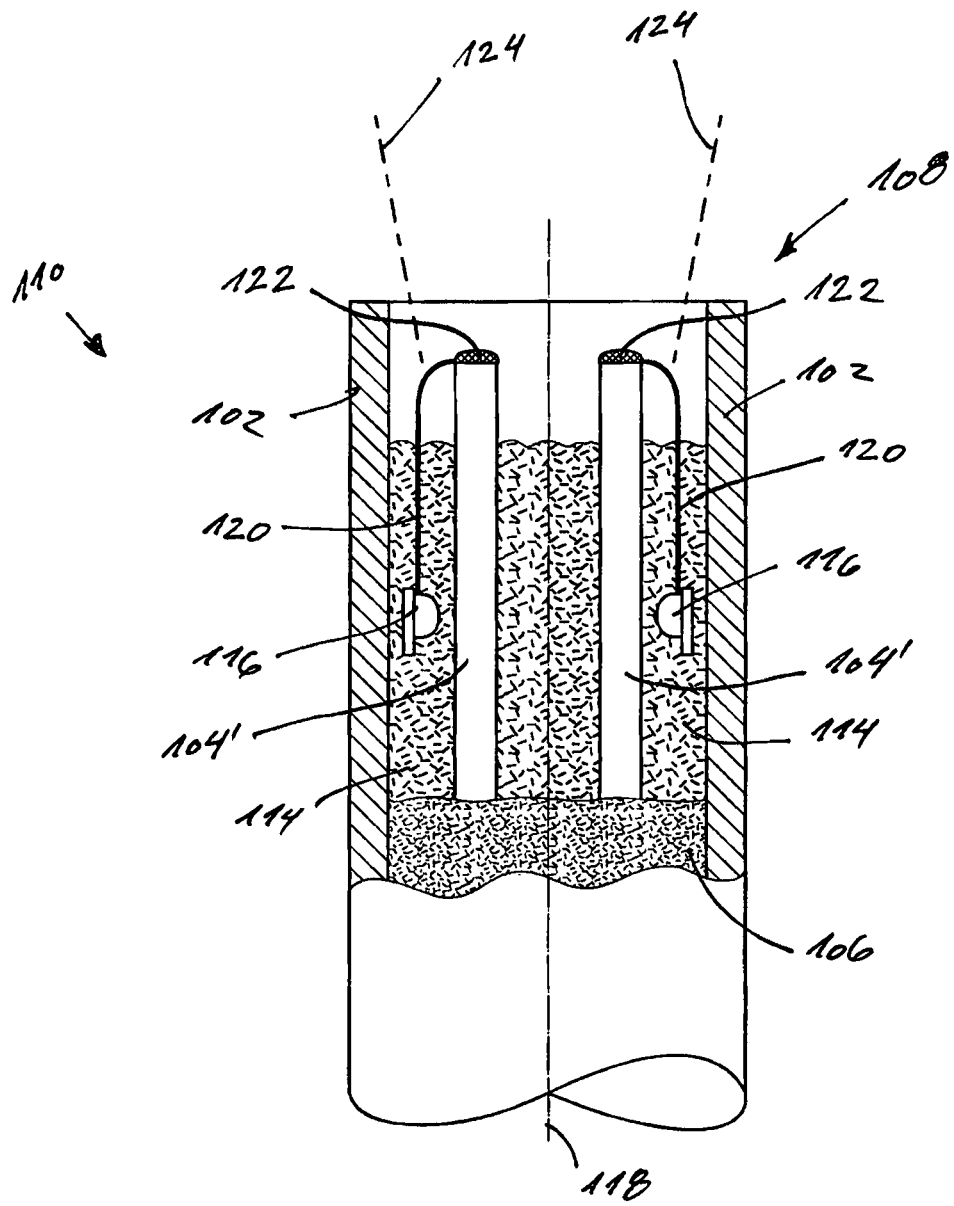

At this position, the cut conductors 104' and the terminals 120 are ready for being soldered or welded to each other. This process is illustrated in FIG. 6. In the case of soldering, the initial step is to provide a soldering material 122 (such as soldering paste) in the area of the ends of the terminals 120 and the cut conductors 104'. Subsequently, a laser beam (indicated by lines 124) is directed towards the soldering/welding material 122 such that the temperature of the material 122 is elevated to a temperature above 900 degrees Celsius, which causes the material to change into liquid form. Subsequently, the laser beam is removed and the material 122 is cooled whereby the soldering emerges. Due to the second insulating material 114, the laser beam does not elevate the temperature of the sensors 116, which thus are prevented from being damaged by the laser beam.

Figure 7:
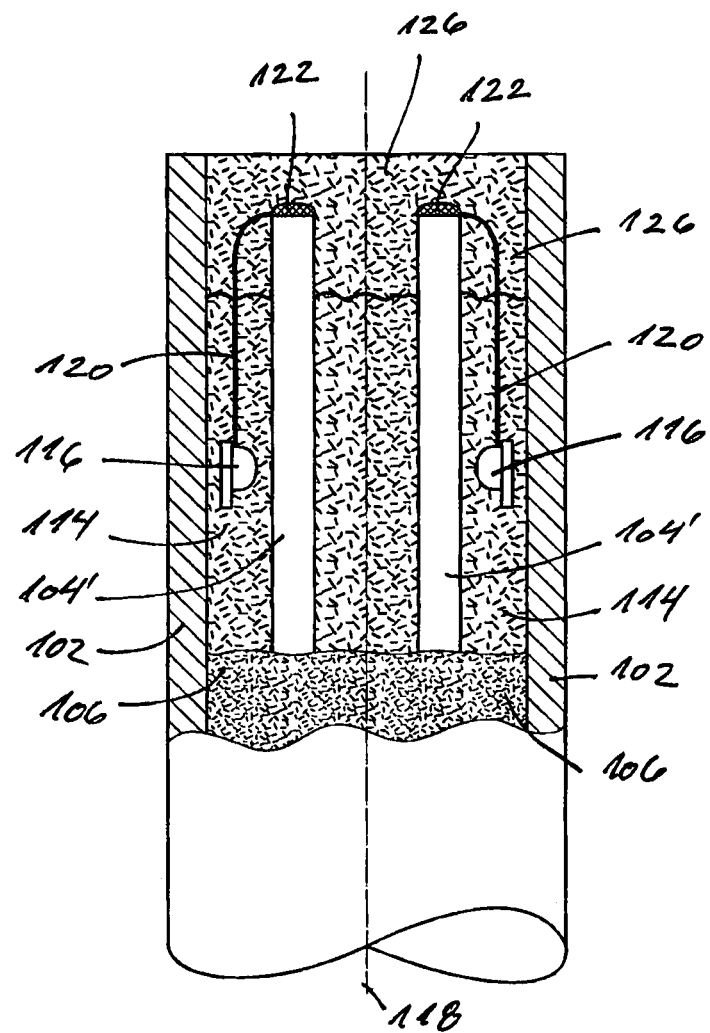

When the soldering/welding has been made a third insulating material 126 is filled into the distal end 108 so as to cover the solderings/weldings 122 and the distal ends of the terminals 120 and the cut conductors 104', see FIG. 7. This is done to protect the solderings/weldings during operation of the temperature sensor unit.

Figure 8:
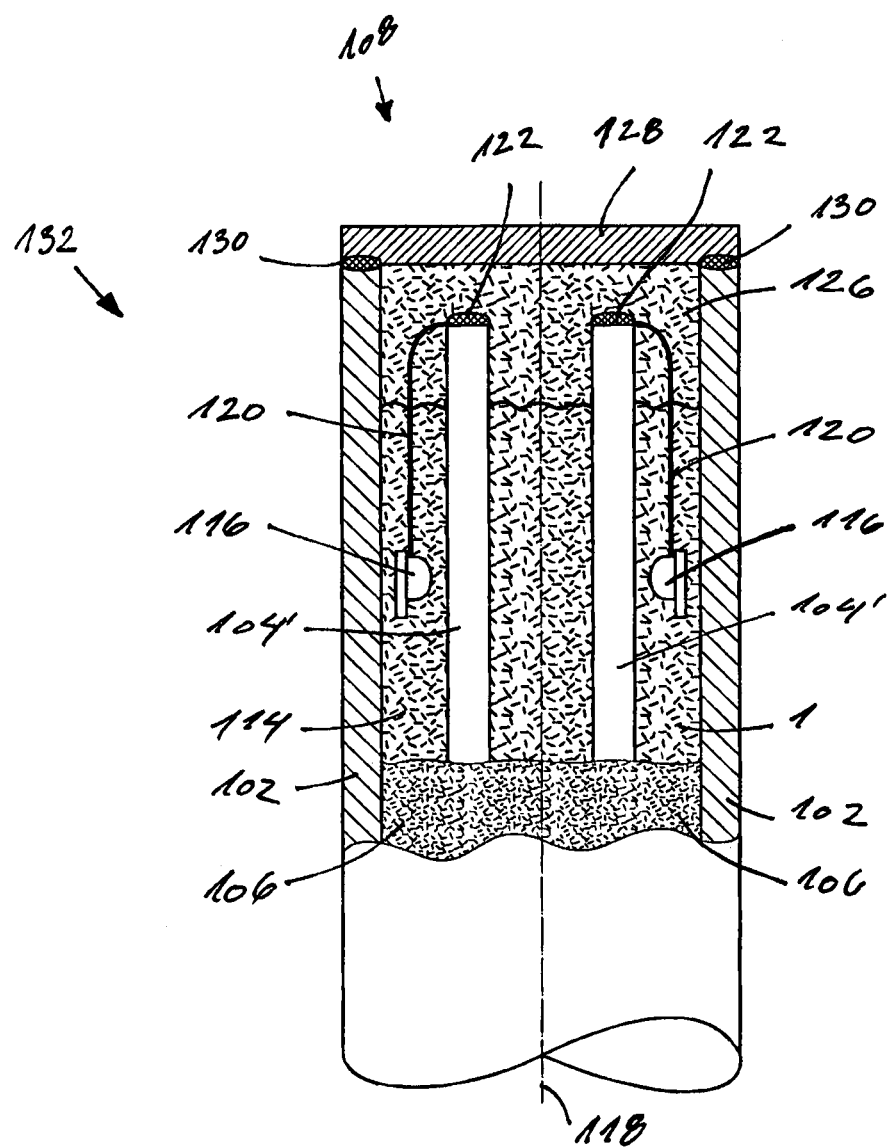

Finally in FIG. 8, a cover 128 is fastened to the sheath 102. However before this is done, the distal end 108 is cleaned and/or ground and/or cut so as to ensure an even and clean surface. The final step is to weld/solder the cover 128 to the sheath 102 such that welding/solderings 130 emerge. When this is done a temperature sensor unit 132 has been formed.

Although the invention above has been described in connection with preferred embodiments of the invention, it will be evident for a person skilled in the art that several modifications are conceivable without departing from the invention as defined by the following claims.

What is claimed is:

1. A method of manufacturing a temperature sensor unit comprising:
    a substantially tubular sheath having a wall, a distal end, and a proximal end;
    one or more temperature sensors each of which comprises a set of sensor terminals;
    at least one set of conductors, each conductor of the set of conductors being soldered and/or welded to one sensor terminal of the set of sensor terminals; and
    a second insulating material having a liquid state and a solid state;
        wherein the conductors and the one or more temperature sensors are arranged with respect to each other such that the conductors are provided closer to the centre of the sheath than the one or more temperature sensors;
    the method comprising the steps, in order, of:
        providing the conductors in the sheath such that in a first zone a space is defined between the sheath and the conductors;
        providing the second insulating material consisting of a liquid in the space;
        positioning the one or more temperature sensors in the space covered by the second insulating material such that the conductors are provided closer to the centre of the sheath than the one or more temperature sensors; and
    thereafter soldering and/or welding each conductor of the set of conductors to one sensor terminal of the set of sensor terminals.

2. The method according to claim 1, wherein the step of positioning comprises the step of positioning the one or more temperature sensors in the second insulating material while the second insulating material is in liquid form.

3. The method according to claim 1, wherein the step of welding and/or soldering comprises the step of:
    soldering and/or welding by means of a laser beam.

4. The method according to claim 1, wherein the step of positioning the one or more temperature sensors comprises the step of:
    positioning the one or more temperature sensors in a position in which the one or more temperature sensors are closer to the wall of the sheath than are the conductors.

5. The method according to claim 1, wherein the step of providing the conductors comprises the steps, in order, of:
    providing the sheath in which the set of conductors are retained relative to the sheath by means of a first insulating material;
    removing a part of the first insulating material in a distal end of the sheath; and
    thereafter reducing the length of the conductors in the area in which the first insulating material was removed.

6. The method according to claim 5, wherein the sheath, conductor, and first insulating material are cut from a prefabricated length of tube.

7. The method according to claim 1, further comprising the step of: curing the second insulating material to convert it from a liquid state to a solid state.

8. The method according to claim 1, further comprising after the soldering and/or welding step the steps, in order, of:
    providing a third insulating material in the area of the solderings and/or weldings so as to completely cover the solderings/weldings; and
    providing a cover at the distal end of the sheath so as to cover the third insulating material.

9. The method according to claim 8, wherein the step of providing a cover comprises the steps of:
    grinding the distal end of the sheath; and
    thereafter securing the cover to the ground distal end.

10. A temperature sensor unit comprising:
    a substantially tubular sheath having a central axis, a wall, a proximal end, and a distal end;

one or more temperature sensors each of which comprises a set of sensor terminals; and at least one set of conductors, the end of each conductor of the set of conductors being electrically connected to a sensor terminal of the set of sensor terminals;

wherein the conductors and the one or more temperature sensors are arranged inside the sheath and with respect to each other such that each of the one or more temperature sensors is located between the conductors and the wall of the sheath and further from the distal end of the sheath than the end of the conductor to which it is electrically connected, and the conductors are provided closer to the central axis of the sheath than are the one or more temperature sensors.

11. The temperature sensor unit according to claim 10, wherein one or more of the one or more temperature sensors are provided closer to the wall of the sheath than to any of the conductors.

12. The temperature sensor unit according to claim 10, wherein the length of the sensor terminals is at least 20 times the width of the sensor terminals.

13. The temperature sensor unit according to claim 10, wherein each conductor defines an accessible end and a connected end, the connected end being soldered and/or welded to one of the sensor terminals and the accessible end being accessible from an outer surface of the temperature sensor unit.

14. The temperature sensor unit according to claim 10, wherein the temperature sensor unit comprises a plurality of temperature sensors, and wherein each sensor terminal of the set of sensor terminals of each of the temperature sensors is connected to a conductor of the set of conductors.

15. The temperature sensor unit according to claim 10, wherein at least one insulating material is provided between each of the one or more temperature sensors and the conductors.

16. The temperature sensor unit according to claim 15, wherein the at least one insulating material is a mouldable material which protects the one or more temperature sensors from radiation of a laser beam.

17. The temperature sensor unit according to claim 16, wherein the mouldable material has a transmittance of laser light which is less than 50 percent of the transmittance of laser light in air.

18. The temperature sensor unit according to claim 15 wherein the insulating material is in one solid element at a temperature range covering at least the operating temperatures of the environment in which the temperature sensor unit is to be used.

* * * * *